United States Patent
Jensen et al.

(10) Patent No.: US 6,438,528 B1
(45) Date of Patent: *Aug. 20, 2002

(54) TRANSACTION MANAGER SUPPORTING A MULTI-CURRENCY ENVIRONMENT

(75) Inventors: Jan Sander Jensen, Lyngby; Henriette Joost, Koebenhavn OE; Martin Schroeder, Maaloev, all of (DK)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,927

(22) Filed: Jun. 5, 1998

(30) Foreign Application Priority Data

Oct. 28, 1997 (GB) .............................................. 9722609

(51) Int. Cl.⁷ .............................................. G06F 17/60
(52) U.S. Cl. ........................... 705/44; 705/26; 709/105; 709/106; 709/101
(58) Field of Search .............................. 705/44, 19, 10; 395/200, 600; 706/10, 49; 709/101, 105, 106, 230, 318

(56) References Cited

U.S. PATENT DOCUMENTS 5,329,619 A * 7/1994 Page et al. ................... 395/200
5,504,894 A * 4/1996 Ferguson et al. ............ 395/650

(List continued on next page.)

FOREIGN PATENT DOCUMENTS

EP 0412232 2/1991 ............. G06F/9/46

OTHER PUBLICATIONS

Enterprise Middleware Series, A white paper, BEA TUXEDO, 1996.*
IBM leads industry with comprehensive strategy, technologies for electronic commerce; electronic shopping, secure transactions; EDGE: Work–Group Computing Report, v7, n312, p4(1), Aug. 1996.*

(List continued on next page.)

Primary Examiner—Eric W. Stamber
Assistant Examiner—Yehdega Retta
(74) Attorney, Agent, or Firm—Jeanine S. Ray-Yarletts

(57) ABSTRACT

A transaction manager includes a dispatcher (22) connected to an input queue (19), one or more output queues and one or more processing module queues (11' to 17'). The transaction manager includes input data handling means (18), responsive to transaction requests received from one or more clients, to place said transaction requests on said input queue. The transaction requests include a service code, indicative of the transaction type, and data specific to a transaction. The manager includes one or more processing modules (11 to 17), the or each processing module associated with a respective processing module queue and being adapted to process processing module queue entries and place any result of said processing on the input queue. The manager further includes output data handling means connected to the or each output queue for forwarding output queue entries to respective clients. The dispatcher is responsive to a service code to place a transaction request on one or more of said processing module queues, and is responsive to a result to place said result on a selected one of the or each output queue.

1 Claim, 3 Drawing Sheets

U.S. PATENT DOCUMENTS

| | | | | |
|---|---|---|---|---|
| 5,530,855 A | * | 6/1996 | Satoh et al. | 395/600 |
| 5,544,325 A | * | 8/1996 | Denny et al. | 395/200 |
| 5,557,798 A | | 9/1996 | Skeen et al. | |
| 5,586,312 A | * | 12/1996 | Johnson et al. | 395/680 |
| 5,634,127 A | * | 5/1997 | Cloud et al. | 395/680 |
| 5,761,507 A | * | 6/1998 | Govett | 395/684 |
| 5,774,872 A | * | 6/1998 | Golden et al. | 705/19 |
| 5,799,283 A | * | 8/1998 | Francisco et al. | 705/19 |
| 5,826,270 A | * | 10/1998 | Rutkowski et al. | 707/10 |
| 5,878,416 A | * | 3/1999 | Harris et al. | 707/10 |
| 5,897,621 A | * | 4/1999 | Boesch et al. | 705/26 |
| 5,903,876 A | * | 5/1999 | Hagemier | 705/19 |
| 5,924,097 A | * | 7/1999 | Hill et al. | 707/10 |
| 5,925,098 A | * | 7/1999 | Freund et al. | 709/203 |
| 5,956,489 A | * | 9/1999 | San Andres et al. | 395/200.51 |
| 6,012,094 A | * | 1/2000 | Leymann et al. | 709/230 |

OTHER PUBLICATIONS

BEA Connect White Paper; http://docs.shiuol.com.cn/beasys/connect/wp/connect_wp.htm, 1996.*

Message Oriented Middleware (MOM), Markku Korhonen, 1997.*

MQSeries: Message Oriented Middleware; http://www–4.ibm.com/software/ts/mqseries/library/whitepaper/mqover/.*

MQ in the middle: ISVs rally around reliable MOM; O'Donnell; Software Magazine, v17, n5, p70 (5), May 1997.*

Comparative review; Web Middleware Glue Binds Web Apps, May 1997.*

TAXWARE Announces Availability of Java Versions of Internet Sales Tax, Sales/Use Tax, VAT & Address Verification Software Systems. www.taxware.com/znewinfo/pressarchive/prchibe/java697.htm.*

WebSpeed White Pager–Butler Group, http://www.realtime.co.za/webspeed/whitep/wp03.html, 1996.*

Progress WebSpeed–White Pagpers, WebSpeed 2.1 Technical Product Brief, http://www.progress.com/internet/webspeed/white/wp_21tech_html.*

TAXWARE Announces Value Added Tax Software; http://webproduction1.taxware.com/znewinfo/pressarchive/prchive/vat.htm, Aug. 1996.*

INTERNET Tax System; http://www.taxware.com/ZProducts/internet/internet.htm.*

WORLDTAX System, The Tax Software Solution for International Taxation; http://www.taxware.com/ZProducts/worldtax/worldtax.htm.*

TAXWARE Signs Leading Web Partners: BroadVision, IBM, Microsoft, Netscape & Open Market; http://webproduction1/taxware.com/ . . . o/pressarchive/prchive/webpart.ht, Sep. 1996.*

TAXWARE Teams with Microsoft to Form Internet Commerce Server Solution; http://webproduction1.taxware.com/ . . . /pressarchive/prchive/micrsoft.ht, Oct. 1996.*

* cited by examiner

TRANSACTION MANAGER SUPPORTING A MULTI-CURRENCY ENVIRONMENT

FIELD OF THE INVENTION

The present invention relates to a transaction manager for, in particular, providing an on-line billing service in a robust and stream-lined solution.

BACKGROUND OF THE INVENTION

When conducting electronic business across, for example, the Internet, a problem arises from the fact that for any transaction a merchant and their customers may be situated in many different combinations of countries. Each combination requires a decision in relation to the tax, if any, to be applied to a transaction. It will also be seen that when the tax for any country is to be applied, the merchant must be able to take cognisance of the different tax regimes, according to the type of product or service, for different countries.

It will be seen that when a merchant is conducting business across the Internet, that it may be possible for many more customer transactions to be carried out than in a traditional commercial environment. It is critical that the processing of any transaction request consumes the minimum of processing resources and is as responsive as possible to the customer, otherwise a loss of custom may result.

It is an object of the present invention to provide a transaction manager capable of supporting billing services in a multi-currency environment.

DISCLOSURE OF THE INVENTION

Accordingly, the present invention provides a transaction manager, said manager including:

a dispatcher connected to an input queue, one or more output queues and one or more processing module queues;

input data handling means, responsive to transaction requests received from one or more clients, said transaction requests including a service code, indicative of the transaction type, and data specific to a transaction, said input data handling means being adapted to place said transaction requests on said input queue;

one or more processing modules, the or each processing module associated with a respective processing module queue and being adapted to process processing module queue entries and place any result of said processing on said input queue;

output data handling means connected to the or each output queue for forwarding output queue entries to respective clients;

wherein said dispatcher is responsive to a service code to place a transaction request on one or more of said processing module queues, and said dispatcher is responsive to a result to place said result on a selected one of the or each output queue.

The dispatcher of the transaction manager enables processing of transaction requests to be carried out by separate processing modules. Processing modules may operate in parallel to reduce processing time, for example, a denied parties list check can be carried out at the same time as a credit card authorization. Modules may operate individually to reduce the amount of processing to a minimum, for example, a VAT (value added tax) calculation can be carried out to provide a quote to a customer before a customer decides to finally purchase a product or avail of a service.

Only if the offer is accepted does a credit card authorization need to be provided. Processing can be carried out in stages, for example, a check can be made of customer details whose output can be returned to act as an input for further processing modules.

DESCRIPTION OF PREFERRED EMBODIMENT

Figure 1:
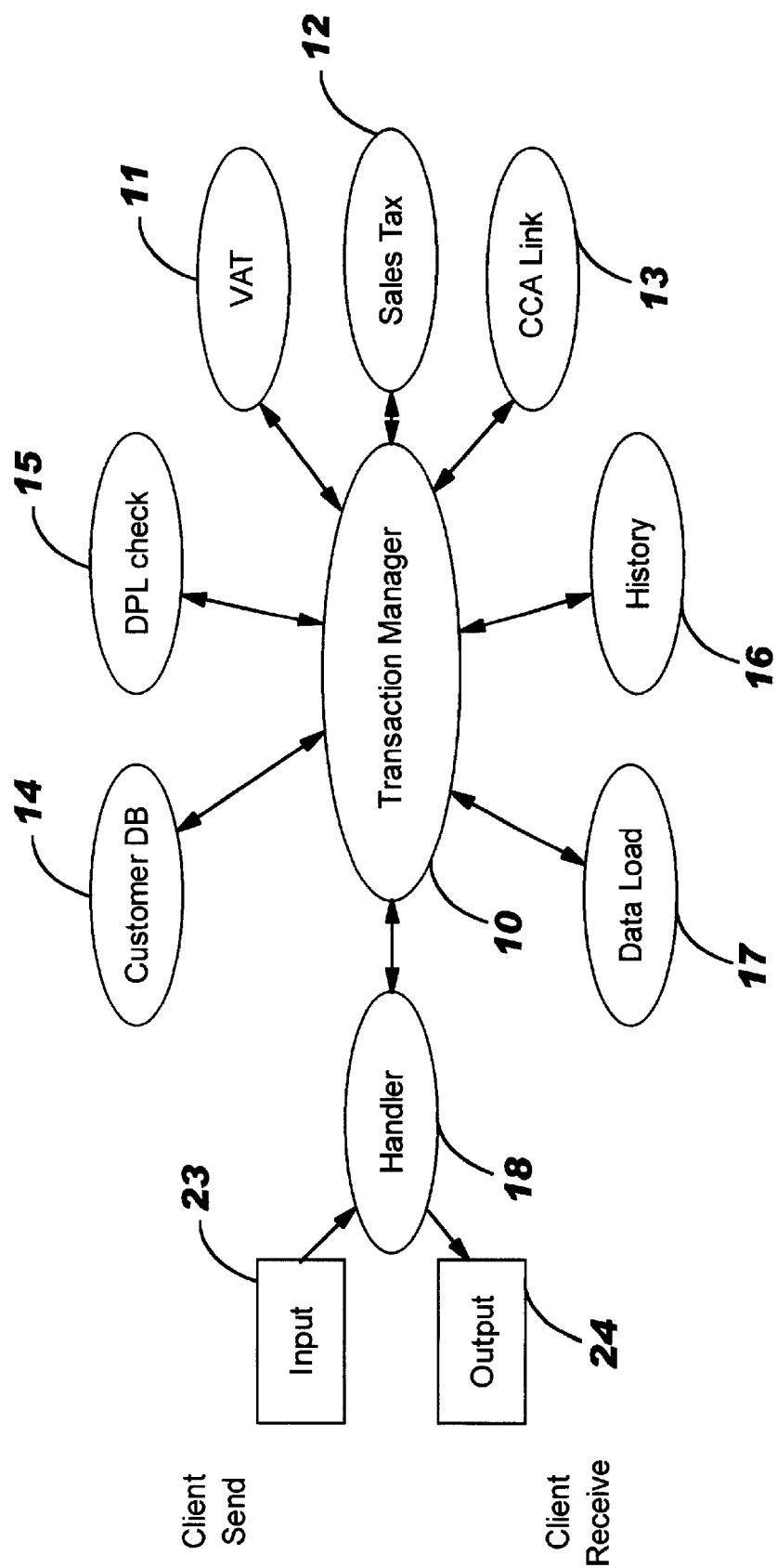
FIG. 1 shows the overall design of a system including a transaction manager according to the invention.

FIG. 1 shows the overall design of billing system including a transaction manager 10 according to the invention. The transaction manager, which is maintained by a service supplier, communicates with a client using the system through a handler module 18 consisting of an input handler 18' and an output handler 18", FIG. 2. The client is a data processing system used by a merchant providing services to a plurality of customers across, for example, the Internet.

The function of an input handler 18' is to receive a client's input data 23 in a first format and convert the data into the system's internally supported data format. This is conducted in a conventional manner and a description of this process is not thought necessary in relation to the current invention. An output handler 18" provides the result of a requested service as output data 24 back to the client in the same data format as the input data.

The present embodiment is implemented in a MVS/DB2 environment using an IBM Information Management System (IMS). Both the input and output handlers run as non-conversational no response IMS transactions. As the system is IMS based, the transactions to be processed by the system must be loaded to the IMS/MVS environment. In the present embodiment, the handlers use LU.6.2 communication, a communication protocol defined by SNA. This provides a logical peer to peer connection between the transaction manager and a client.

Figure 2:
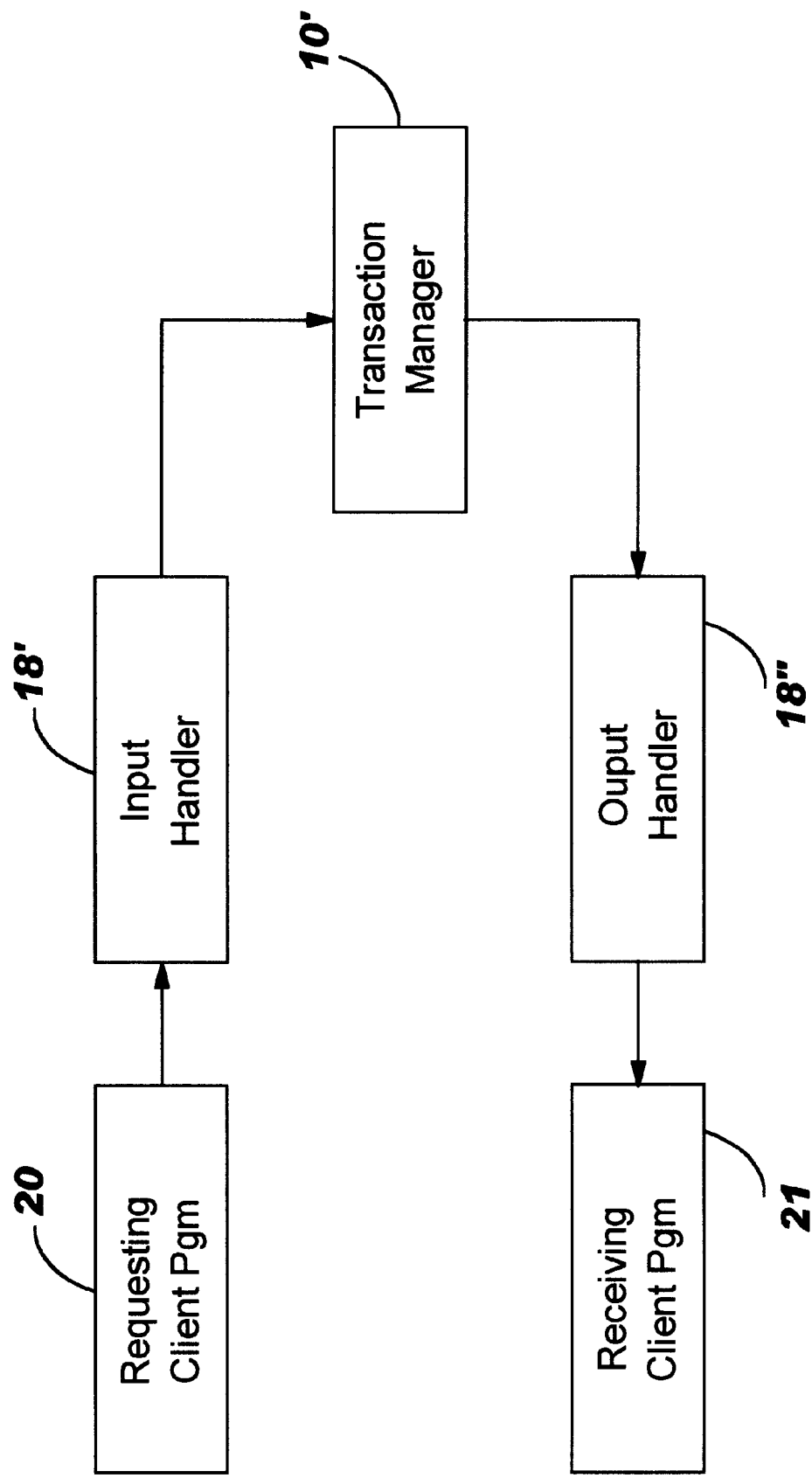
FIG. 2 shows an interface to the system.

Thus, a client machine running a requesting program has an LU 6.2 connection to the IMS transaction manager system, FIG. 2. A requesting program 20 invokes an assigned input handler on the IMS to deliver the input data 23 in a specified format. One or more input handlers are provided according to the number of different input data formats which clients may wish to use. Clients using the same input data format call the same input handler. The system output data (reply) is sent from an assigned output handler to a receiving program 21 again according to the data format used by the client.

The primary requirement of the transaction manager 10 is to handle data flow between the handlers 18', 18" and process modules 11 to 17. Each process module 11 to 17 carries out a specific task which may operate independently, in a sequence, or in parallel according to the type of transaction.

Figure 3:
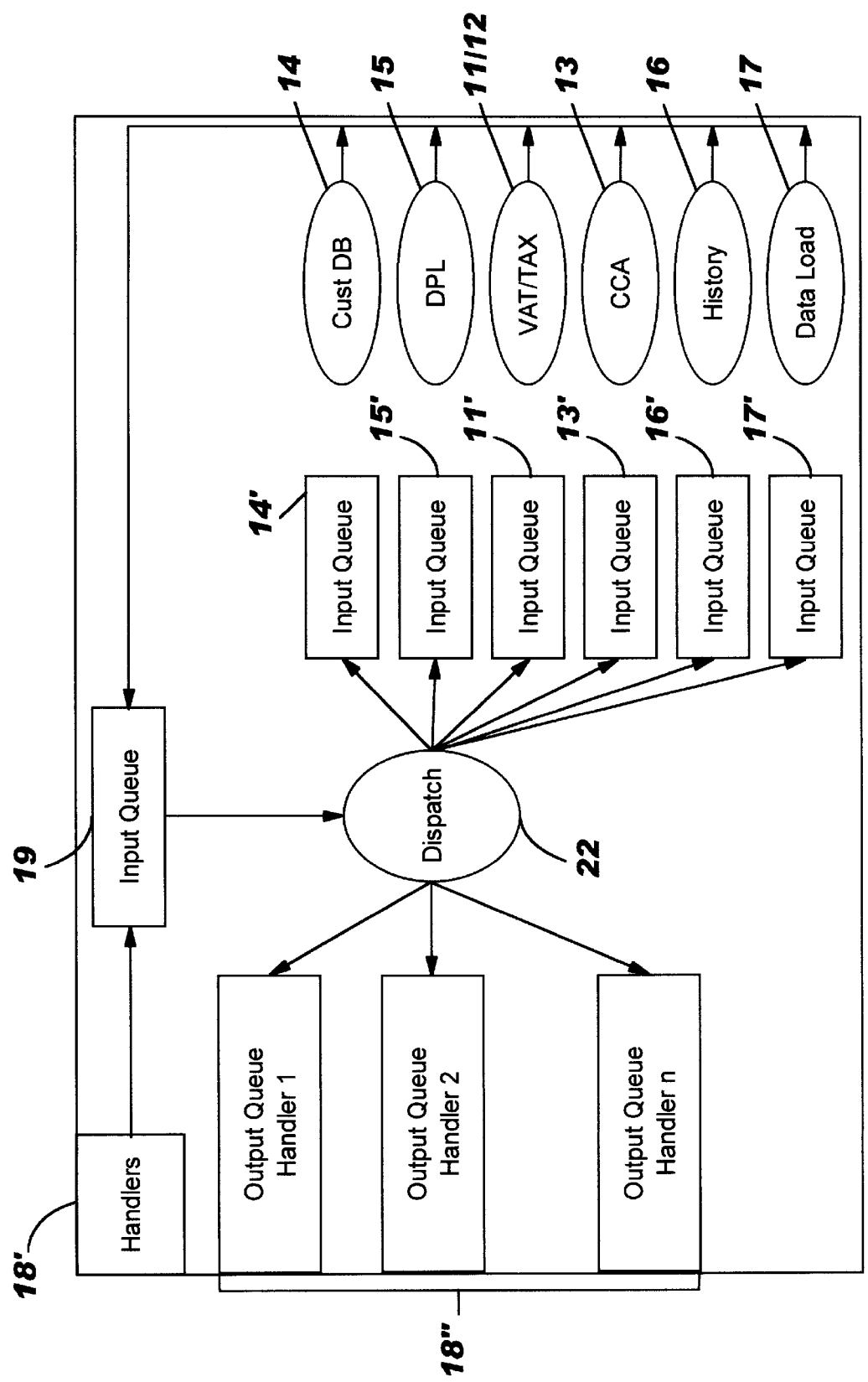
FIG. 3 shows the internal transaction manager design together with its process modules.

The input handlers 18' convert the standard format input data 23 to the supported data format used internally in the transaction manager. The converted data are placed on one common input queue 19 with one separate output queue for each output handler, FIG. 3.

Each process module 11 to 17 has its own input queue 11' to 17'. The transaction is sent to the different process modules by a dispatch process 22 which enters the data on the individual process modules input queues 11' to 17'. When a transaction is entered into the input queue 11' to 17', the process is activated. The result of the process is written to the input queue 19. When all the required processes for a transaction have been completed, the final result is put on the output queue 1 ... n for a client's handler, where a return message is sent to the client by an associated output handler.

The architecture described above allows the process modules and input/output handlers to operate independently in an essentially asynchronous manner. If, for example, a number of transactions only require a VAT/tax calculation, then their transaction information will be placed on the queue 11' by the dispatcher 22. A transaction communicated to the system beforehand, which requires information to be returned from the customer database module 14, a denied parties list check 15 on that customer, a credit card authorization check 13 for the amount of a purchase, and several writes to the history file 16 may take longer to process, but will not hold up to independent processing of the VAT/tax calculations.

The advantages of using asynchronous architecture is that the process modules are only activated whenever required, and that the various process modules can run in parallel.

It will be seen that, should a given process module tend to become overloaded, the process module could be duplicated and thus speed up the turn around time for the services. This could be done simply by providing a second input queue 11' to 17' and a duplicate processing module. The dispatcher then monitors the state of the input queues to determine which is able to receive a transaction request.

The process modules 11 to 17 are activated according to a service code included in the input data 23 from the client. The service code can request one or more process modules to be performed for a single transaction before the result of the processes are returned to the client. The function of each of the process modules 11 to 17 will now be described in more detail.

Handler Module

When an input handler 18' receives transactions from a client, some control data are validated to ensure that the process is controlled and that only permitted clients with allowed services are processed. Where control data is incorrect according to an agreed set-up for the specific client, the transaction is returned to the client with a message code. Another aspect of the data validation is to avoid unnecessary processing and to provide the customer with a quick response.

A project code is included in the data input from the client. When setting up a new service, a project code is assigned to the service. A DB2 project table is established on MVS to load all project code data. Each client using the system is assigned a unique project code, and the project table has a specification of the service codes permitted for the project code. The project table must be updated and completed for each new project code and service.

The function of the project table is to extract some standard data when a transaction is received by the system. This data extraction limits the size of the input data. The data is extracted for each transaction by the use of the project code from the input data 23. The input project data preferably includes: Project Code, Project Description and Service Code specification.

Data returned from the project table can be broken into a number of categories:

Client Data:
Client Name
Client Business Address
Client Country Code
Client VAT Reg. No. Country X
Client VAT Reg. No. Country Y
Client VAT Reg. No. Country Z
Merchant Data:
Merchant credit card No.
Currency:
permitted project currency
Payment:
permitted project payment options
Client Data: The client defines who the services are delivered on behalf of. The client data are used within the VAT/tax process module, to be described later.

Merchant Data: the credit card Merchant number set-up for credit card authorization used in the credit card authorization module, to be described later.

VAT Module (Service Code=VAT)

The VAT module 11 supports all the various business scenarios the system is to provide including triangulation business flow, where the client, customer and service supplier reside in different countries. The term customer is used in relation to an end user either private or corporate.

The VAT module determines if and how to calculate VAT. The system includes a table of VAT treatment practices for all existing scenarios to determine VAT. The module includes an intelligent decision model where the VAT practice for a particular transaction can be determined, making it possible to calculate VAT on-line. The VAT determination is based upon the input data from the client.

The VAT treatment practices decision model divides sales into 5 product categories, each with individual VAT treatment practices.

The 5 product categories are:

ESD (electronic software delivery) Services or Intellectual Services—selling information, banking, licenses, royalties, data processing, advertising or counselling.

Telecommunication Services—selling transmission, emission or receipt of signs, signals or writing for telecoms use.

Administrative Services or General Services—selling subscriptions, general services or other services not within the 2 other service classifications except from transportation and real estate services.

Goods—selling goods movement cross border e.g. physical software delivery.

Publications—selling publications, manuals.

Calculation of VAT is based on a number of assumptions:

Distance selling: when performing distance selling, an EU (European Union) customer (a private individual) must be charged VAT on an invoice. A seller can choose to be in a EU country different from the customer's and claim a customer VAT rate applicable in the country of seller. But only up to a certain limit. When a lower threshold value is reached, the seller must register in the country of the buyer and, from then on, must invoice the customer with VAT applicable in the country of the buyer. The seller can also choose to register before the limit is reached. The system makes a comparison of the country of the seller (client) and the buyer (customer). If the seller is VAT registered in the same EU country as the customer for the ordered product category, then the VAT is determined and calculated based on the VAT practices in the seller and customer country. In case the client is not VAT registered in the country of the customer, the default client VAT registration country is applicable.

Definition of Service: service is always delivered/provided in or from the country of the seller Product categories on invoices: due to variations in the VAT practices and sets of rules mentioned for the product categories services and goods. Services, Publications and Goods cannot be invoiced on the same invoices.

VAT registration Number: The customer VAT registration Number must be provided to the system in the standard format input data. The system validates the VAT registration number based upon the VAT registration number structure in the different EU member countries. For customers not providing any VAT registration number or an invalid VAT registration number, VAT is applied as per a private customer.

The actual VAT rates for product categories are provided by establishing a DB2 table containing VAT rates for European countries. The ISO standard for currency decimals is deployed in the VAT calculation e.g. Danish Kroner has 2 decimals, and the VAT calculation is accordingly per order line.

US Sales Tax Module

In the present embodiment, an application in front of the VAT 11 and the US sales tax 12 modules determines whether the VAT module or the US sales tax module is activated. The application activates the VAT/tax modules according to the following criteria:

- seller country=US and customer country=US=→activate US Sales Tax module
- for all other scenarios the European VAT module should be activated It will be seen that the input to US Sales Tax Module 12 requires a different specification of product types than for the VAT module 11, although a description is not thought necessary in relation to the present invention.

Credit Card Authorization (CCA) Module (Service Code=AUTHORIZE)

In the present embodiment, the CCA Module 13 only authorizes (or reserves an amount) in one currency, for example, Danish Kroner (DKK) and, as such, the currency for the transaction must be converted to this currency before the CCA Module is activated. In order to do so, a currency table on MVS/DB2 is applied to this module. Thus, the amount of the transaction in the correct currency, the customer's credit card number, the client's Merchant Number forwarded to the CCA module for use in the actual authorization process.

The result code and result message from the CCA Module are sent to the system and included in the return message back to the client/customer.

A modulus check on the credit card number is preferably performed before sending the transaction to the CCA Module for validation and authorization. The modulus check performs logic checking to determine if the credit card number complies with the rules for a credit card number. If the modulus check fails, the transaction is returned unprocessed with a message to the client. The client/customer then receives a quicker answer than by waiting for the transaction to be fully validated. The modulus check also improves the quality of the transaction sent to a clearing house by the CCA module for clearing.

It should be seen that the CCA module only provides authorization to debit an amount from a customer credit card account. In the present embodiment, it is the back end processing system which actually charges the customers account, once a transaction requiring a charge is completed.

Customer Database API Module

The purpose of the module 14 is to enable the system to generate a request for customer data from a customer database and to receive data from the customer database to be used in the processing of a transaction. The customer database need not be within the system environment, and can be internal or external. This process is applicable for a service set-up where the required customer data is not included in the data input from the client.

The system processes the customer data request for each transaction based upon a customer account number and a code indicating the customer databases to extract the data from. An API between a customer database and the system is established for each individual customer database.

Where the system customer database API process is required for a service, this module is activated first, and the returned customer data is input as a transaction request to the remaining process modules 11 to 13 and 15 to 17.

The input from the system to the customer database is as follows:

a. customer account number
b. dedicated customer database code for the specific customer database
c. order amount—without VAT/tax The output of the customer database request is as follows:

a. customer database code
b. account number
c. customer type
d. customer name, title
e. customer invoice to address
f. customer ship to address
g. phone number, fax number, e-mail address
h. language code
i. VAT registration number/tax exempt
j. certification id
k. VAT applicable (tax exempt)
l. payment method
m. credit limit exceeded (Yes/No)*
n. credit limit The system validates that the customer's credit limit has not been reached by comparing order amount (point c) from the input to customer database and the customer credit limit amount (point m) in output. Where the order amount is less than the credit limit, the transaction should be processed. Where the customer's credit limit has been reached, the transaction should be returned unprocessed with an explanatory text. For services where the customers should have applied VAT or tax the credit limit validation will be on the amount before VAT/tax calculation and application.

DPL (Denied Parties List) Check Module

The DPL module 15 can result in 3 different codes:

0 the DPL check has been performed successfully. The transaction can proceed processing and the answer is returned to the client.

1 the DPL check is still in progress, and the customer must be investigated further. The DPL check is considered performed successfully as the system provides an on-line service and a transaction cannot wait several days before further processing or rejection. In case the result of the further investigation turns out negative, these very few cases must be handled manually by the service supplier contacting the client.

2 the DPL check generates a hit in the DPL list and no sale/service must be provided to the customer. The reply back to the client must include an appropriate explanation.

Data Load Module (Service Code=CAPTURE)

When the transactions have been successfully processed within the process modules 11 to 16, the transactions are loaded to a DB2 table, which is the interface to a back end accounting system, which generates revenue, payments and reports for transmission to the client.

History Module

To comply with legal requirement, the module 16 generates a history file (DB2) to log the received, processed and returned transactions within the system. Another purpose of the history file is to control the data flow in the system with interfacing modules.

The log is preferably a DB2 table where the status is updated whenever an activity on a transaction has been performed. The key field in the history file comprises the transaction project code and order number.

The history file data overview is specified in table 1 below.

Logging of the process time enables optimization of the process modules and allows the service supplier to specify turn around time for new clients.

Error Handling

The error handling for system failure of the system service is implemented using roll back procedures. A roll back procedure cleans up transactions as if they were never processed. The cleaning up process is automatic and is performed whenever the system fails to complete a required action. The system generates a message that the transaction was not completed and the transaction must be re-transmitted for re-processing.

Error handling for the remaining process is as follows:

Input handler, output handler and transaction manager—if these are not up and running, the IMS Queue Management (IQM) system ensures that they are restarted.

VAT calculation—if this application is stopped during processing of a transaction, the customer will be asked to re-transmit the transaction, by returning a dedicated return code and message. No roll back of the transaction needs to be performed as the VAT process is a calculation with no updates of any internal/external databases nor systems.

US Sales Tax—if this application is stopped during processing of a transaction, the customer will be asked to re-transmit the transaction, by returning a dedicated return code and message. Again, no roll back of the transaction

TABLE 1

History file Overview

| Input | | Time Log | Data Log |
|---|---|---|---|
| 1 | Incoming Transaction | input time | log of incoming data from 1a to 1c |
| 1a. | Customer Information | — | see description below |
| 1b. | Order Infomation | — | see description below |
| 1c. | Payment Information | — | Credit Card, SET, Account, e.g |
| 2. | VAT/Tax Module | input/output time | VAT/Tax result (rates and amounts) |
| 3. | DPL Check Module | input/output time | OPI, check result (0, 1, 2) |
| 4. | CCA Module | input/output time | authorization result |
| 5. | Customer API Module | input/output time | result is the customer information |
| 6. | Data Load Module | input/output time | load result (sequence # from data load table) |
| 7. | Outgoing Transaction | output time | result code (−1, 0, 1) return code & description |
| 8. | Roll back | time stamp | what process has been rolled back |

Customer Information contains:
customer name ship to customer address
invoice to customer address customer phone, fax, e-mail
customer type VAT applicable
language code credit limit
VAT registration number—if completed by customer
Order Information contains:

| Tax/VAT classification | product number |
|---|---|
| product description | price |
| transport method | delivery terms (date) |
| number of order lines | number of ordered products |

The incoming transaction is only logged once with the data from 1a to 1c as this will be redundant data in case the same transaction is processed in steps. For each performed process module the result of the process should be logged together with the start and end time for the process. This is point 2 to 6 in table 1. Where the service is set-up in steps, the incoming time of the transaction is set to when the requested service is activated.

needs to be performed as US Sales tax is a separate program called to perform the US sales tax calculation with no updates of any internal/external databases nor systems.

DPL process—if the separate DPL check program on the MVS is not available or is stopped before the process is completed, the DPL check program provides the system with an answer that DPL is not available, and the client will be asked to re-transmit the transaction.

Customer Database—if the customer database, where customer information is to be extracted is not available or stopped during processing, re-transmission of the transaction is required.

Process Flow

The system receives an input (standard format input data) from a requesting program 20 (the client) and the input is loaded to an input handler 18'. The handler 18' converts the input to the transaction manager language. The transaction manager then ensures that the proper process modules are activated as requested. Each of the supported process modules can be activated separately. This is done using the service code from the input data.

Each time a process module 11 to 17 is activated and the transaction is processed, the result of the process is returned to an output handler 18", transformed to the standard format output data and fetched by the receiving client program 21. Within the standard format output data are fields containing the result of each process.

Take an example where a client requires that the system should calculate VAT, conduct a credit card authorization and load the information to the data load DB2 table:

A French customer orders 2 items from a British client. The customer enters his customer information (name, address, country code, VAT reg. No) and his payment data (VISA and FRF). The order is transferred to the system together with project code, service code (VAT) and the product category of the 2 ordered items added by the client.

The input handle 18' verifies that the project code and the service code are valid. Currency code is also checked for permission in that project. The input handler converts the input to the system internal data format and adds the client data (Name, address, country code and VAT registration number).

If the customer's VAT registration number is validated and not accepted, the customer is then classified as a private customer. (Alternatively the transaction can be rejected.) Because the client is British, the VAT decision model determines that the customer must pay a 17.5% VAT rate on the 2 ordered items. The output is the VAT amount for each order line (item) and the total gross amount.

The output is sent to the output handler 18", converted and received by the client program.

The customer gets the result, and realizes that his VAT registration number was not entered correctly, he changes the number and the same request is transmitted again.

The system VAT module 11 accepts the new VAT registration number and the VAT decision model determines that no VAT is applicable for the transaction.

The result is returned to the customer, who accepts the order and pushes a pay button.

An AUTHORIZE service request is now forwarded to the system by the client, together with the result of the VAT process (VAT amount/rates). The system activates the interface with the CCA Module on MVS and transmits the required information. This includes the client's Credit Card Company merchant number, which together with the credit card number, expiry date and amount in Danish Kroner, is sent to the CCA module. The CCA module returns an accept code and a text which will be transmitted to the client. The client accepts the order as deliverable and sends the last request with a CAPTURE service code for processing by the data load module 17. The last request contains both VAT process result and the CCA result.

The customer receives a message from the client that his order has been processed successfully and the payment is accepted.

Thus, it will be seen from the foregoing description that the system according to the invention is capable of receiving a service code combining several process modules to be activated and to include the result of the performed processes in the output to the client. Only the minimum number of processing modules are employed at each stage of processing the transaction, thus reducing processing overhead and improving throughput.

It will be seen that the system does not require an interface to any specific platform but can be implemented using the CICS transaction monitor, the MQSeries communication manager or the FTP communication protocol or whatever a client requires. It is the client's own responsibility to ensure proper system set-up, if the client demands a synchronous process flow. A handler is set-up for each different interface required by a client. In case several clients use the same data format, one dedicated handler can support these clients. If, however, the data volume gets too heavy, a separate handler can be established for each client.

It will also be seen that, although the present embodiment relates to credit card billing services, the invention is applicable to any payment method including cheques, bank transfer and giro. It will also be seen that transactions processed by the invention can be debit or credit transactions.

It will be seen that various additional modules can be added to the system. For example, a product catalogue could be established to extract stock allocation for a product number, implement stock control and validation of client permissions per product. The product catalogue module would be identical to the customer database API as this module is to interface to an external database and extract some information. The key information provided to the module would be based upon the product number and a code to identify the specific database. The extracted information would contain the following fields: name of the product catalogue, supplier name, product text, price, stock available/not available, stock allocated (Y/N), delivery date, transport method, comment field.

Another process module could also be provided to enable electronic software delivery. This would be useful where customers order software from a client/merchant via a shopping mall and the software is delivered by allowing the customer to download the software. The process module would preferably interface with a key management system, where a unique key is generated based upon the software product number of the transaction. Once generated, this unique key would be sent back to the system which acts as a facilitator for the customer. This enables the system to provide a full e-business service for electronic delivery of software.

Similarly, the system could be extended to handle Tax Exempt US customers. This would require a customer to deliver his certificate proving that he is tax exempt. The certificates id must be established in a DB2 table, where the id included in transaction would be verified against the entered certificate id in the DB2 table.

It may also be useful to provide a credit card authorization reversal process. Thus, if a transaction has been provided an authorization code, but the charge is for some reason then required not to be made to the customer's credit card, a reversal transaction must be sent to the credit card companies through the CCA module in order to clear the amount reservation on the credit card.

What is claimed is:

1. A method of conducting transactions in a transaction manager connected to a computer network, comprising the steps of:
   receiving at the transaction manager a transaction request from a client over said network, said request including a service code specifying the type of transaction and data for the requested transaction;
   placing said transaction request on an input queue;
   examining said service code, and in accordance therewith transferring said request to both (i) a first processing module queue associated with a first processing module for performing VAT or sales tax calculations; and (ii) a second processing module queue associated with a second processing module for performing credit card authorizations;

processing said transaction request at both said first and second processing modules and generating a overall result of the processing;

placing said overall result on an output queue; and forwarding the overall result from the output queue back to the client in order to respond to said transaction request;

wherein the processing of said transaction request at said first processing module is performed either in parallel or in sequence with the processing of said transaction request at the second processing module, dependent on the value of the service code for the transaction request;

further comprising the step of duplicating said first or second processing module, if processing at the respective module becomes overloaded.

* * * * *